Aug. 26, 1958 D. E. WIEGAND 2,849,543

MAGNETIC PLAYBACK SYSTEM

Filed June 2, 1955 2 Sheets-Sheet 1

Inventor
DAVID E. WIEGAND by Hill, Sherman, Meroni, Gross & Simpson Attys.

Aug. 26, 1958 D. E. WIEGAND 2,849,543

MAGNETIC PLAYBACK SYSTEM

Filed June 2, 1955 2 Sheets-Sheet 2

Inventor
DAVID E. WIEGAND by Hill, Sherman, Meroni, Gross & Simpson Attys.

United States Patent Office 2,849,543

Patented Aug. 26, 1958

2,849,543

MAGNETIC PLAYBACK SYSTEM

David E. Wiegand, Villa Park, Ill., assignor to Armour Research Foundation of Illinois Institute of Technology, Chicago, Ill., a corporation of Illinois Application June 2, 1955, Serial No. 512,763

3 Claims. (Cl. 179—100.2)

This invention relates to a magnetic playback system, and particularly to such a system for reproducing a recorded signal on a magnetic record medium without the necessity for the conventional equalization circuit.

The present invention is based on the discovery that by modulating the output of a conventional magnetic playback head in a magnetic circuit, an output is obtained which is satisfactory directly without the need for any equalizing expedient to compensate for the nonlinearity of the response of the playback head.

It is therefore an important object of the present invention to provide a novel playback system utilizing a conventional playback head but which produces a satisfactory output without equalization.

It is another object of the present invention to provide a novel playback system which is adapted to utilize the tuned amplifier, detector and audio system of a conventional radio set without any modification whatever of the radio.

Other objects, features and advantages of the present invention will be apparent from the following detailed description of certain preferred embodiments thereof, taken in connection with the accompanying drawings, in which.

As shown on the drawings.

Figure 1:
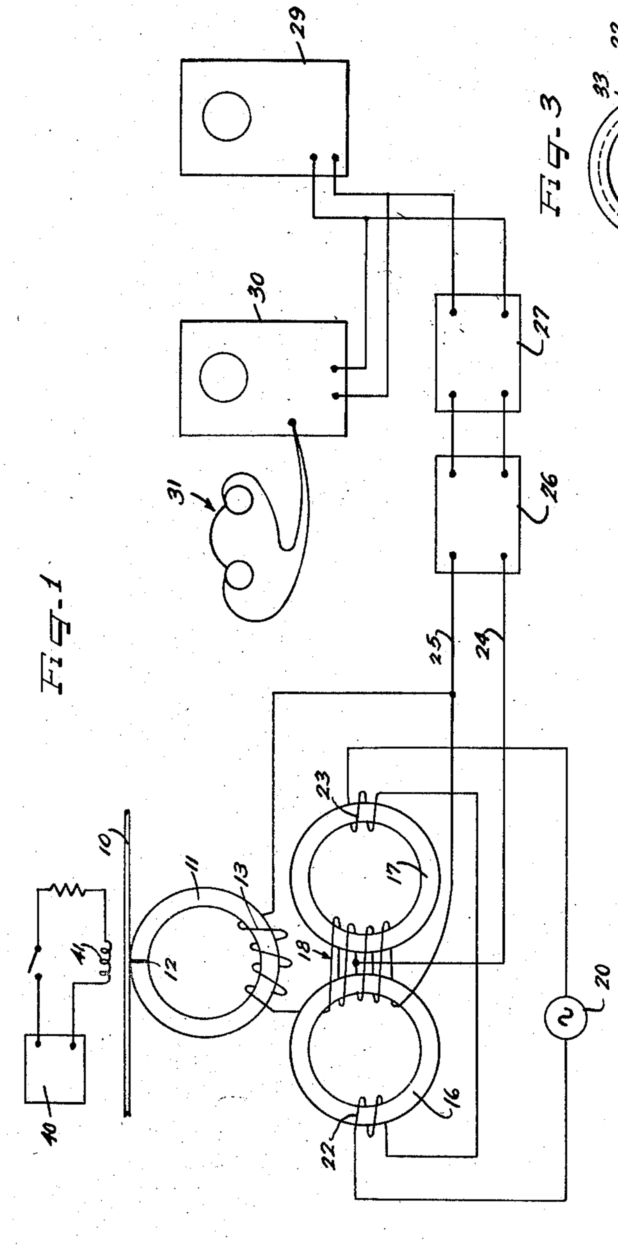
Figure 1 is a schematic view of a first playback system in accordance with the present invention.

Referring to Figure 1, the reference numeral 10 designates a magnetic record medium which is adapted to have a suitable magnetic recording thereon and which travels over the magnetic playback gap 12 of a magnetic playback head 11. Magnetic flux from the record medium linking the core 11 induces a voltage in the coil 13 which is a function of the time derivative of the input signal.

In accordance with the present invention, but in a manner which is not clearly understood, the non-linear response of the playback head 11 is compensated for by modulating the induced voltage from the coil 13 in a magnetic circuit. The magnetic circuit may comprise a pair of toroidal cores 16 and 17. In the illustrated embodiment the induced voltage is modulated by coupling the pickup winding 13 to a winding 18 which links both of the cores 16 and 17. The cores are excited from a high frequency source 20, which may for example have a frequency of 256 kilocycles per second, by means of windings 22 and 23. The cores 16 and 17 are preferably of material to be readily saturated so as to produce a harmonic output when a signal flux is present in the cores. The operating point of the cores 16 and 17 may be offset from a balanced condition by means of a small magnet such as indicated at 22 in Figure 3, or a D. C. current may be utilized for setting up unidirectional polarizing fluxes in the cores 16 and 17 to offset the operating point. In any case, the polarizing flux in the cores 16 and 17 is preferably greater than the maximum signal flux established therein from the pickup winding 13.

The output from the cores 16 and 17 may be taken across a portion of the winding 18 by means of leads 24 and 25 and be fed into an amplifier 26 tuned to the desired even harmonic of the frequency of the oscillator 20, preferably the second harmonic. The output from the tuned amplifier 26 is fed into a detector 27 which may be a conventional amplitude modulation detector such as found in conventional radio sets, the output from the detector being indicated by means of a cathode ray oscilloscope 29 and a vacuum tube voltmeter 30 as well as by head phones 31.

Figure 3:
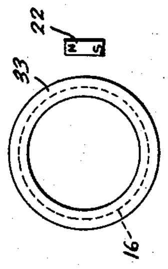
Figure 3 is a top plan view of the structure of Figure 2.
Figure 2:
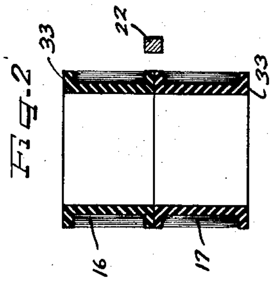
Figure 2 is a vertical sectional view of a pair of toroidal cores as utilized in the embodiment of Figure 1.

It has been found that the modulating cores 16 and 17 may suitably be made as shown in Figures 2 and 3 wherein spools 33 of non-magnetic material each have a peripheral channel receiving, for example, 10 wraps of .000125 inch thick by .125 inch wide "Molypermalloy." The spools 33 may have an outside diameter in the channel thereof of approximately one-quarter inch and may be approximately a quarter inch long. Windings 22 and 33 may comprise 5 turns of No. 30 heavy formvar wire, and the two cores placed coaxially together as shown in Figure 2 may receive an additional winding 18 of approximately 50 turns of No. 32 heavy formvar wire, substantially filling the interior space of the spools 33.

With an arrangement such as disclosed herein, it was unexpectedly found that the output from the system was satisfactory without the need for any equalization. It was also found that with the illustrated system the noise level was very good, being of the same order as tape noise (as indicated by the fact that the increase in noise was definitely noticeable when the tape was started to move across the head), and the output level from the system was very satisfactory.

Figure 4:
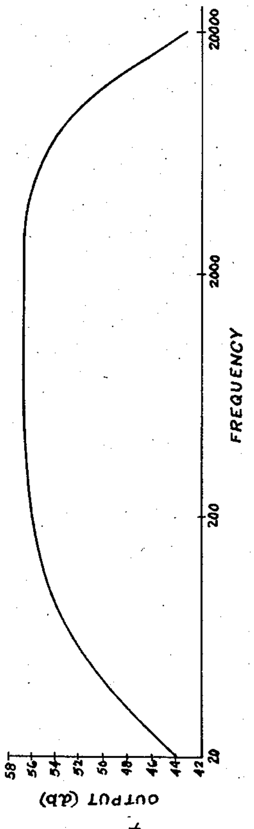
Figure 4 is a frequency response curve for the system of Figure 1.

The reference numeral 40 indicates a conventional audio oscillator and the reference numeral 41 represents a coil which were used in testing the playback system to obtain the curve of Figure 4, in order to avoid errors which might otherwise be introduced by the characteristics of the tape, the tape speed, gap effects and the like. As illustrated in Figure 4, it was found that the output was substantially constant between 100 cycles and 5000 cycles and dropped about 8 db at 10,000 cycles.

Figures 5, 6:
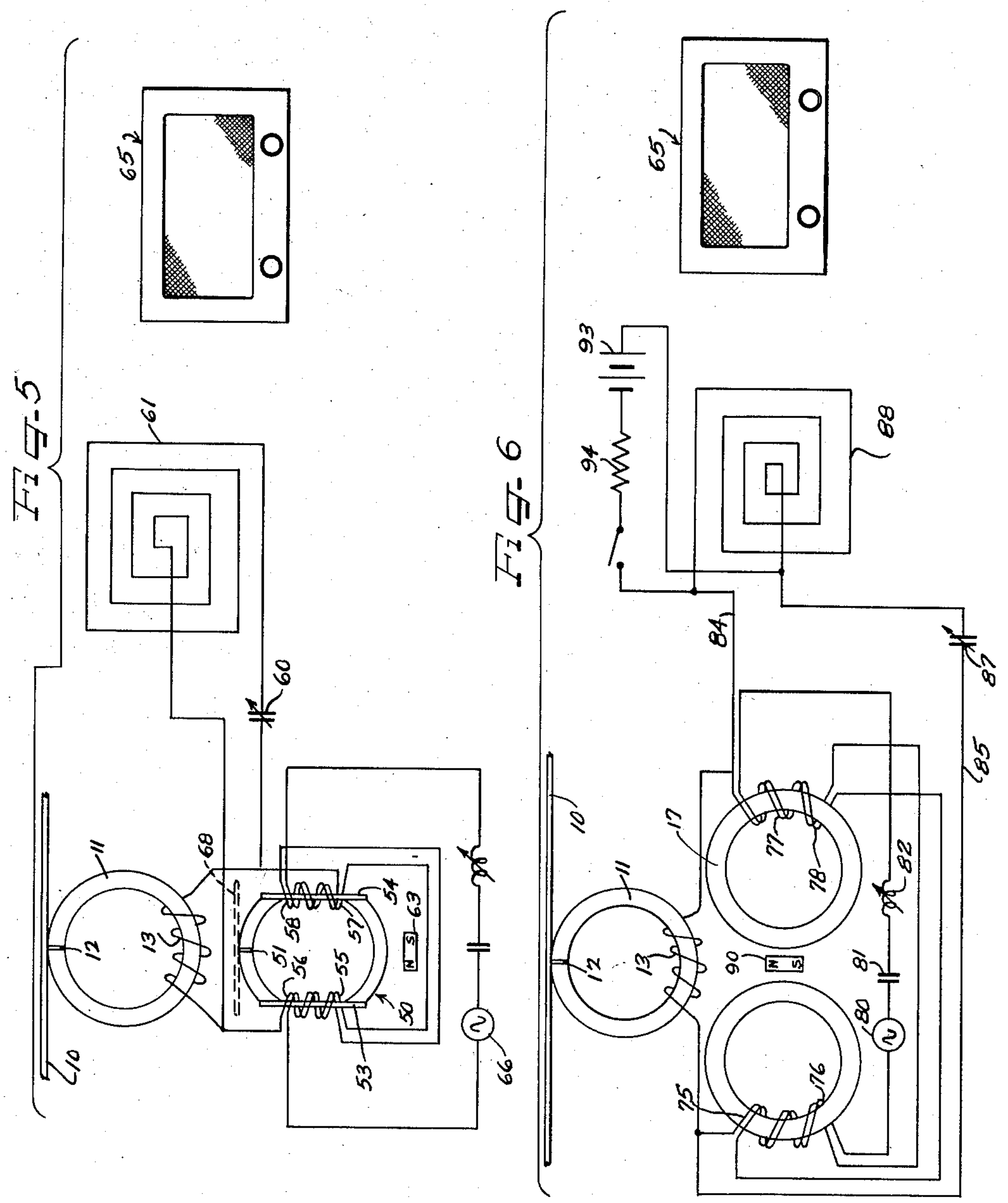
Figure 5 is a schematic illustration of a playback system for coupling into a conventional radio set.
Figure 6 is a schematic view of a further playback system for coupling into a conventional radio set.

Referring now to the system of Figure 5, the record medium and playback head may be entirely similar to that of Figure 1 and have been given corresponding reference numerals; however in this case a single magnetic modulator head core 50 having a non-magnetic gap 51 is utilized for modulating the induced signal voltage from the coil 13. The head may be provided with a pair of reduced cross section saturating strips 53 and 54 which may receive bifilar windings 55, 56 and 57, 58 wound and connected as shown in Figure 5, the windings 55 and 57 serving to establish opposing high frequency fluxes in the core 50 which are generally balanced with respect to the gap 51, and the windings 56 and 58 serving to couple the pickup coil 13 to the modulator core 50 and serving to deliver the harmonic output to a tuned circuit including a variable capacitance 60 and an antenna loop 61. A suitable small magnet 63 may establish a polarizing flux in the modultor core 50 which polarizing flux preferably exceeds the maximum signal flux established in the core 50.

The antenna loop 61 radiates the modulated signal so that it may be picked up by a corresponding antenna loop of a radio set 65. For example, if the windings 55 and 57 are excited by means of an oscillator 66 at 300 kilocycles per second, the radio set 65 would be tuned to 600 kilocycles per second. The capacitance 60 and the antenna loop 61 are preferably series tuned to the second harmonic to eliminate radiation of the fundamental frequency if it is not completely balanced out in the core 50. The oscillator 66 should be well shielded to eliminate radiation of unmodulated power which might otherwise be picked up by the radio set 65.

With one set up as illustrated in Figure 5, it was found that reception was satisfactory when the radio receiver was within about 2 feet of the transmitting loop 61. At 6 feet from the transmitting loop, the received signal was well down, and in an adjacent room the signal was not detectable, so that there is no problem of interference from the radiated power in the system of Figure 5. With the system of Figure 5, it was likewise found that unexpectedly no equalization was necessary for satisfactory results.

As illustrated in dash outline at 68 a magnetic record member may be passed over the gap 51 of the modulator core 50, and the signal reproduced by the same apparatus shown in Figure 5, the coil 13 being disconnected for example. This arrangement is even simpler in utilizing only a single magnetic core and has likewise been found to operate very satisfactorily.

In Figure 6, the playback head and record medium are again similar so that corresponding reference numerals have been applied in Figure 6. Similarly, the two modulating cores may be identical to those in Figures 2 and 3 and have been given the same reference numerals. The cores each have a pair of bifilar windings 75, 76 and 77, 78, respectively, the windings 76 and 78 being excited by means of a high frequency oscillator 80 having a series circuit including a capacitance 81 and variable inductance 82 tuned to the fundamental of the oscillator 80. The windings 75 and 77 are connected in series across the pickup coil 13 and the harmonic output is delivered by means of leads 84 and 85 connected to windings 75 and 77 to the transmitting circuit including capacitance 87 and loop antenna 88 tuned to the second harmonic of the oscillator 80. A suitable polarizing flux may be introduced into the cores 16 and 17 in the manner illustrated in Figures 2 and 3, and a small permament magnet is indicated at 90 for this purpose. Alternatively, the polarizing flux may be introduced by means of the battery 93 and variable resistance 94 to establish a polarizing flux in the modulating cores 16 and 17 greater than the maximum signal flux of the opposite polarity. The radiated signal from the loop antenna 88 may be picked up in a radio receiver 65 identical to the receiver of Figure 5.

It was found that the arrangement of Figure 6 worked much better than that of Figure 5; the signal to noise in the sound from the receiver was much better, the percentage of modulation in the cores 16 and 17 was apparently higher, and the balance of low and high frequencies was adequately good for the receiver capabilities.

It will be understood that many other circuits and designs not specifically discussed, for accomplishing the results in accordance with my invention, will occur to those skilled in the art. What I consider to be my invention and upon which I desire to secure protection is embodied in the accompanying claims.

In addition to the objects of the invention set forth above, it is a further object of this invention to provide a playback system having an output signal level in the one volt range.

I claim as my invention:

1. In combination, a playback system for obtaining a relatively linear output without equilization comprising a magnetic playback head having an induction coil for producing a signal voltage related to the time derivative of signal flux linking said head, a modulating core having winding means thereon connected to said induction coil for establishing a signal flux therein upon establishment of a signal flux in said playback head, and means for establishing a high frequency exciting flux in said modulating core for modulation by the signal flux therein.

2. In combination, a playback system for obtaining a relatively linear output without equalization comprising a magnetic playback head having an induction coil for producing a signal voltage related to the time derivative of signal flux linking said head, a modulating core having winding means thereon connected to said induction coil for establishing a signal flux therein upon establishment of a signal flux in said playback head, means for establishing a high frequency exciting flux in said modulating core for modulation by the signal flux therein, and tuned amplifier and detector means coupled to said modulating core for demodulating the output from said core.

3. In combination, a playback system for obtaining a relatively linear output without equalization comprising a magnetic playback head having an induction coil for producing a signal voltage related to the time derivative of signal flux linking said head, a modulating core having winding means thereon connected to said induction coil for establishing a signal flux therein upon establishment of a signal flux in said playback head, means for establishing a high frequency exciting flux in said modulating core for modulation by the signal flux therein, and antenna means coupled to said modulating core for radiating the modulated output from said core.

No references cited.